Feb. 26, 1957
K. O. BOWER
2,783,430
AUTOMATIC TIMED BATTERY CHARGER
Filed Nov. 30, 1955
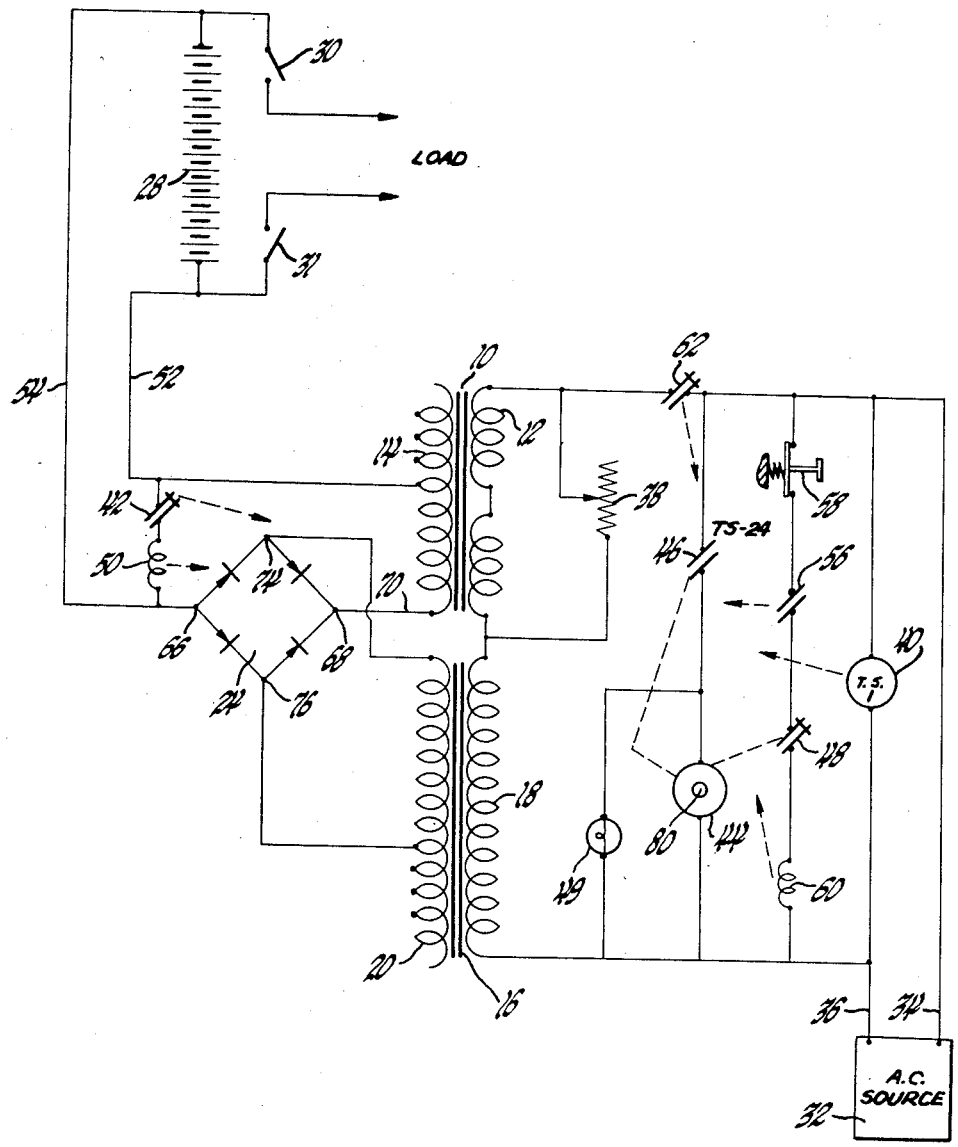
Inventor
Kendall O. Bower
By
E. W. Christen
Attorney ns Patent Office 2,783,430
Patented Feb. 26, 1957

2,783,430
AUTOMATIC TIMED BATTERY CHARGER

Kendall O. Bower, Western Springs, Ill., assignor to General Motors Corporation, Detroit, Mich., a corporation of Delaware Application November 30, 1955, Serial No. 550,036

2 Claims. (Cl. 320—31)

This invention relates to automatic timed battery chargers and has for its general object to provide apparatus of this character specially suited for use in automatic, unattended, electrical power plants.

In accordance with the present invention, there is provided a timed battery charging control system having a first timing control which effectively tests the condition of the battery each hour and controls the charging thereof depending upon its condition, and a second timing control which is actuated by an operator to override the first timing control and provide continuous charging of the battery for a prolonged, definite period of time, as for charge equalizing purposes.

The invention, both as to its organization and operation, will appear more fully from the following description and drawing which is an electrical, schematic circuit diagram of an automatic timed battery charging apparatus in accordance with the present invention.

The charging apparatus comprises in the main a saturable reactor 10 having an A. C. winding 12 and a tapped D. C. winding 14; a transformer 16 having a primary winding 18 and a tapped secondary winding 20; a dry-type, full wave rectifier 24; and a multiple-cell battery 28 which is adapted to be connected to a load through switches 30, 31.

The A. C. winding 12 of the reactor is connected in series with the primary winding 18 of the transformer for energization from an A. C. source shown at 32 over conductors 34 and 36. A rheostat 38 is shown connected in shunt across the A. C. winding of the reactor to adjust the current distribution and division of voltage between the reactor and transformer. Connected between conductors 34 and 36 is a first branch circuit including a first cyclically operating timing relay 40 of the definite time operated variety such as a timing motor for example, having a pair of normally closed contacts 42. A second timing relay or motor is shown at 44 having a set of normally-open contacts 46, which are connected in series therewith in another branch circuit connected across conductors 34 and 36, and a set of normally-closed contacts 48. A signal lamp 49 may be connected across the second timing motor 44 to indicate when it is energized.

The normally-closed contacts 42 of the first timer motor 40 are connected in series with a voltage sensitive relay 50 of the definite voltage variety, across conductors 52 and 54 which are connected to the opposite sides of the battery. Relay 50 has a set of normally-open contacts 56 that are connected in still another branch circuit between conductors 34 and 36 which includes a push button 58, the contacts 56 of relay 50, the normally-closed contacts 48 of the second timer motor 44 and a battery charging relay 60. The battery charging relay 60 has a set of normally-closed contacts 62 which are connected in conductor line 34 in series with the primary winding of the saturable reactor and transformer, as shown.

Rectifier 24 has its diagonal terminals 66 and 68 connected between conductor 54 and conductor 70, which is connected to one side of the D. C. winding 14 of the reactor, the other side of which is connected to conductor 52. The conjugate terminals 74, 76 of the rectifier are connected directly across the secondary winding 20 of the transformer.

In the operation of charging apparatus, the first timer motor 40 is continuously energized and operates cyclically to open its contacts 42 for, say, one or two minutes every hour, thereby deenergizing relay 50 during the time that contacts 42 are open. Relay 50 may be a temperature-compensated, voltage-sensitive relay which will operate to close its contacts 56 when the applied voltage is at a first predetermined level and to open its contacts at a second predetermined level considerably lower than the first. For applied voltages less than the said first predetermined level, which for purposes of illustration may be taken as 133 volts representing the charged condition of the battery, the relay 50 will not close its contacts.

Upon reclosing of the contacts 42 of the timer motor 40 to connect the relay 50 back across the battery, the relay 50 will close its contacts 56 if the total battery voltage is at least 133 volts to complete the energizing circuit for the battery charging relay 60 from the A. C. source. Energization of relay 60 opens its contacts 62 to interrupt the energization of the saturable reactor and transformer of the charging circuit.

If the battery voltage is below 133 volts, the relay 50 will not close its contacts 56. The energizing circuit for the battery charging relay 60 will be open and its normally-closed contacts 62 will remain closed to complete an energizing circuit for the saturable reactor 10 and transformer of the charging circuit. The battery will continue to be charged for such a period of time until its voltage attains the voltage at which the relay 50 will pick up or close its contacts.

In order to extend the service life of the battery, it is desirable that the individual cells thereof occasionally receive a prolonged equalizing charge. This may be accomplished through the expedient of the second timing control which may be actuated or initiated by the operator upon his occasional visits to the unattended power plant in which this apparatus may be employed.

The timer motor 44 is provided with a manually operable push button 80 which, upon actuation, causes its normally-open contacts 46 to close and its normally-closed contacts 48 to open. Closing of contacts 46 connects the timer motor 44 for energization from the A. C. source across conductors 34, 36, while the opening of contacts 48 prevents the battery charging relay 60 from being energized during the period of operation of the second timer motor. During the period of operation of the second timer motor 44, which could be 24 hours for example, the control provided by the first timing motor 40 is overridden and ineffective, the battery being continuously charged during this period from the self-regulating charging arrangement afforded by the reactor 10, transformer 16 and rectifier 24 drawing current from the A. C. source.

Upon completion of the 24 hour charge equalizing period, the contacts 46 of the timer motor 44 will open and contacts 48 will close to restore control to the first timing control circuit.

The spring-returned push button 58 enables checking the operation of the battery charger. Where the battery is fully charged, for example, the contacts 62 of the battery charging relay 60 will be open and the charger will not draw any current from the mains or A. C. source. In order to determine whether the charger is operable under the above-stated conditions, the operator, upon his trip to the plant, may depress the push button 58 momentarily, thereby interrupting the energization of the battery charging relay which will close its contacts and draw current from the mains as long as the button is depressed. An ammeter ordinarily would be included in the mains circuit to indicate current drain therefrom.

What is claimed is:

1. In a battery charging apparatus including charging circuit means connected between an electrical supply source and said battery supplying a charging current thereto, a first timed control means periodically testing the condition of said battery including a first definite time operated relay energized from said source and having a pair of normally-closed contacts adapted to be opened for a definite short period of time each cycle of operation of said relay and a voltage sensitive relay connected to said battery through said contacts of said time-operated relay and having a pair of contacts connected in circuit controlling relation in said charging circuit means, and a second timed control means including a set of contacts overriding the control function of said first timed control means and connecting said battery to said charging circuit means for a definite prolonged period of time.

2. In a battery charging apparatus including charging circuit means connected between an electrical supply source and said battery supplying a charging current thereto, a timing motor relay connected for energization from said source and having a pair of normally-closed contacts adapted to be opened for a definite short period of time each cycle of operation of said relay, a voltage sensitive relay connected to said battery through said contacts of said timing relay and having a pair of normally-open contacts, a battery charging relay connected for energization from said supply source through said contacts of said voltage sensitive relay and having a pair of normally-closed contacts connected in circuit interrupting relation in said charging circuit means and a second timing motor relay including a set of normally-closed contacts connected in series with said battery charging relay, said second timing motor relay having a manually operable start button starting operation thereof and opening said normally-closed contacts thereof.

No references cited.